(12) United States Patent
Fogarty

(10) Patent No.: US 6,311,180 B1
(45) Date of Patent: Oct. 30, 2001

(54) METHOD FOR MAPPING AND FORMATTING INFORMATION FOR A DISPLAY DEVICE

(75) Inventor: John H. Fogarty, Austin, TX (US)

(73) Assignee: Linx Data Terminals, Inc., Austin, TX (US)

( * ) Notice: Subject to any disclaimer, the term of this patent is extended or adjusted under 35 U.S.C. 154(b) by 0 days.

(21) Appl. No.: 09/537,006

(22) Filed: Mar. 28, 2000

(51) Int. Cl.⁷ .................................................... G06F 17/30
(52) U.S. Cl. ................... 707/4; 707/2; 707/10; 707/102
(58) Field of Search ............... 707/2, 4, 10, 102

(56) References Cited

U.S. PATENT DOCUMENTS 6,088,594 * 7/2000 Kingdon et al. ..................... 455/457

FOREIGN PATENT DOCUMENTS

19962192-A1 * 12/1999 (DE) ............................... G06F/17/21

OTHER PUBLICATIONS

Whelan, Carolyn, Squeezing Web Data, Electronic News, V4, No. 2208, Mar. 2, 1998, p. 46–47.*
Moore, Mark, HTML takes on Smart Phones, PC Week, v14, n26, Jun. 23, 1997, p. 58.*
Anonymous, OpenTV Spyglass Prism, downloaded from opentv.com on Jun. 4, 2001, p. 1–14.*
Anonymous, OpenTV Wap Microbrowser, downloaded from opentv.com on Jun. 4, 2001, p. 1–3.*

* cited by examiner

Primary Examiner—Paul R. Lintz
(74) Attorney, Agent, or Firm—Haynes & Boone, LLP

(57) ABSTRACT

A system and method is disclosed for dynamically generating a display document to conform to a display device according to viewing preferences of a user of the display device. The method selects display elements from an application description file, and maps them on a display area in a functional manner. For each user, a predetermined user profile can indicate recommended viewing preferences so that a desired presentation of the information can be produced accordingly.

31 Claims, 3 Drawing Sheets

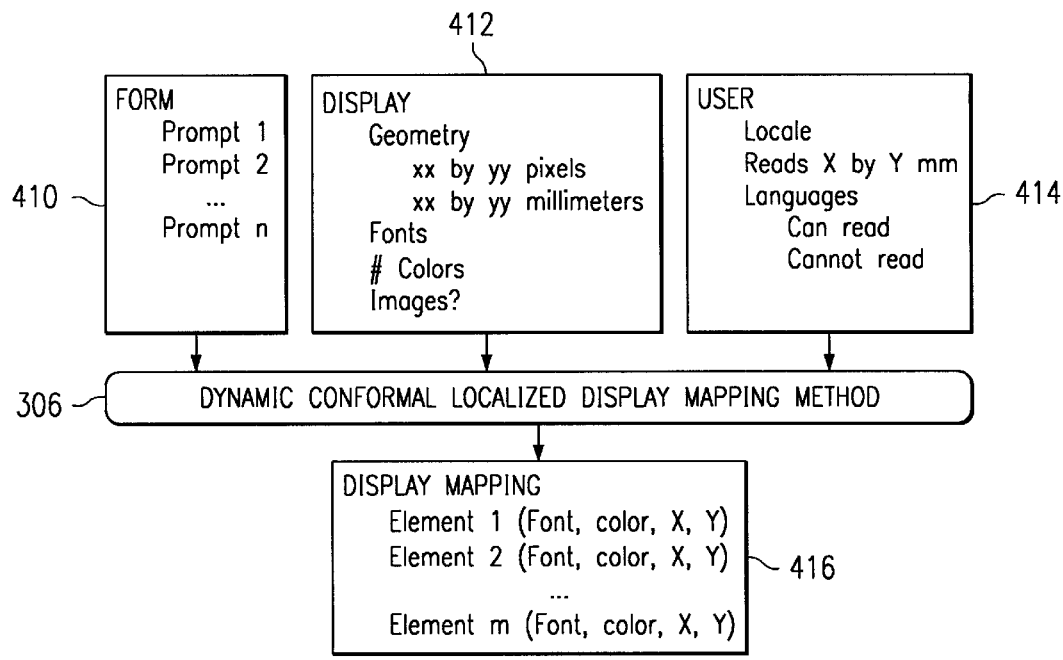
FIG. 4
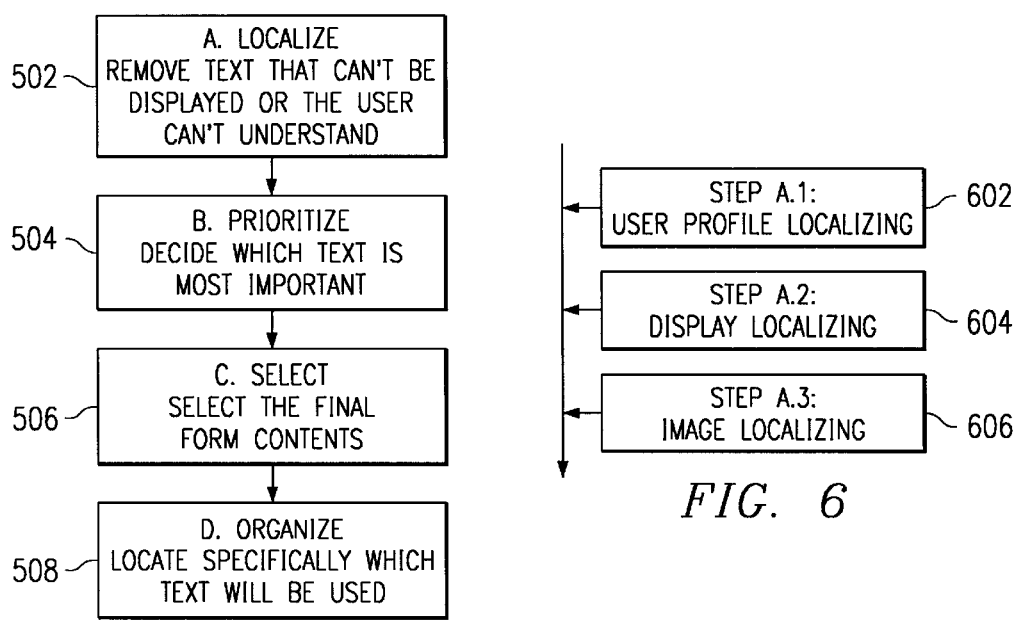
FIG. 5
FIG. 6

METHOD FOR MAPPING AND FORMATTING INFORMATION FOR A DISPLAY DEVICE

BACKGROUND OF THE INVENTION

The present invention relates generally to data formatting and communications, and more particularly to a system and method for dynamically mapping and formatting information for presentation on a computer display device.

The ever-increasing capabilities of computer networks and the internet has brought an increasing demand for information accessibility. Not only do people use desktop computers to access networked data information, various communication devices also provide a capability for displaying large volumes of information. It is increasingly important now for a user of modern communication devices to be able to access various information available on a company-wide intranet, the internet and/or other networked communication infrastructure. Usually information providers store and supply the information while numerous users access the information using many different types of display devices, such as desktop computers, laptop computers, cell phones, personal digital assistant (PDAs), etc. However, many types of display devices are of different shapes and sizes, especially those for mobile devices, and often accept the information in different formats.

It is a common practice to store a document or an application (collectively "document") on a server computer. The document may also include a defined page orientation for appropriately transmitting and mapping the stored information to an individual display device. With the proliferation of available display devices on the market, more limitations are inevitably imposed on the display devices with respect to their display characteristics. This proliferation has caused a number of problems in displaying a single document on a wide array of display devices, especially with regards to page orientation.

One problem for efficiently displaying information on a display device is "conforming" the document, i.e., arranging the information in a predetermined format to be used by the display device. This is also referred to as a conformal problem. Taking the popular internet data communication structure as an example, when a user accesses an individual web page document, the document is transmitted as a file to the user's display device. If the web page document was not designed by the original programmer/designer to be in an appropriate format and size as supported by the receiving display device, then the accessed web page may become difficult, if not impossible, to read.

Although a typical desktop computer web browser is able to display almost any web page document of various dimensions and/or complexity, various mobile communication devices (e.g. cell phones or pagers) may have very limited display space. Furthermore, some communication devices do not have a web browser available. Further still, in some cases, the display is limited to only a couple of lines. In these situations, it is almost impossible to maintain the original page orientation because the page as designed simply can not fit in the small display. If the original page orientation is removed from the document, or not defined at all, then the document can not properly conform to the display device.

Referring to FIG. 1, an internet based data communication network 10 is shown to illustrate the conformal display problem. In this example, a document including individual web pages 102a–102n is stored in an application server 104. The application server 104 is connected to a database (DB) 106 and an e-commerce server 108 for formatting the web pages and transmitting them to a web server. It is understood that the servers 104, 108 and DB 106 may actually represent one or more different servers that may contain one or more separate databases on an as-needed base. Moreover, any one document may contain a series of displayable files such as the web pages.

The web pages 102a–102n are to be transmitted to a web server 110, and then transmitted via hypertext transport protocol (HTTP) to different receiving display devices 112, 114 and 116. Display devices 112, 114, and 116 have different sized "display views" 118, 120, and 122, respectively. A display view defines the display area on a display device, and is described in display parameters such as the number of characters, the number of character rows, the number of character columns, font and image capability, and so forth. For example, computer 112 is a typical desktop using a web browser and Display View 118 is capable to display web pages in Hypertext Markup Language (HTML) format. Computer 114 is a cell phone and Display View 120 has a comparatively small viewing area. The web pages created for Display View 118 may not be used on the Display 120 because of specific display limitations.

In order to display the web pages 102a–102n in a useful and practical way, they are separately recreated and/or reformatted. In addition, the web pages would have to be rewritten in a language compatible with the display device, e.g., a mark up language that the display device 114 can accept. It is understood that languages such as Wireless Markup Language (WML) and Handheld Device Markup Language (HDML) are typical for wireless communication display devices, but are significantly different from languages such as HTML which is used for the display device 112.

One of the reason that the WML and HDML were created is because the wireless communication display devices can not handle many display objects, such as pictures, multimedia objects, and so forth. Similarly, for a personal digital assistant (PDA) 116 which has a browser that can display information in languages other than the HTML, the web pages 102a–102n on the application server 104 are required to be reformatted by a web page designer/programmer to fit for Display View 122.

With the above described communication structure in place, the availability of a single document to be used by various display devices requires that the document be recreated in different formats. A designer/programmer usually has to create, at the document level, a document for each expected display device format. As the numbers and types display devices increase, and as the documents become more complex, the conformal problem becomes more troublesome.

For example, three different models of cell phones may have three different display views. One model may have a text interface of four display lines with twelve characters on a line; another model may have a text interface of twelve display lines with sixteen characters on a line, and the third model may be able to cope with images and may have a graphical interface. Traditionally, a separate document must be created for each model of the cell phone. Not only does this require extra time to create the documents, the created documents may clog the application server. Moreover, maintaining these different versions of the original document are excessively burdensome.

Therefore, problems caused by the conventional model in creating multiple documents for different display devices inevitably impose an unnecessary cost on the development and maintenance effort. Moreover, the designer/programmer has to anticipate what new display devices or new versions of the existing display device are going to be used in the future and what their capabilities will be so that the designer can constantly create new documents.

Another problem for efficiently displaying information on a display device is "localizing" the document, i.e., interpreting the information in a predetermined style for the user the display device. For example, a web page document may be created in one part of the world (e.g., France) and received in another (e.g., the U.S.). The user receiving the document may prefer the document be in a specific language (e.g., English). The display device may also be programmed to indicate a preferred language that the user can understand. However, in the conventional model, in order to present the document in different languages, a copy of the document must be created in each specific language. Similar to the detrimental consequences of the conformal problem, additional development and maintenance problems are induced for creating and managing web pages in different languages.

A method is thus needed for effectively and efficiently creating and maintaining a document/application for a wide array of display devices with varying display characteristics to meet the needs of different users of the display devices.

SUMMARY OF THE INVENTION

A system and method is provided for display mapping so that documents can be readily displayed on a wide array of display devices. The system and method can be dynamic, can be conformal, and can be localized. In one embodiment, the method selects display elements from predetermined source contents, selects formatting characteristics conforming to display limitations of a specific display device, and maps the elements on the display device in a manner which is most likely to be functional and pleasing to a user of the display device as directed by predetermined viewing preferences of the user.

The dynamic aspect of the method refers to the mapping of the display elements of the application based on characteristics of display views when they become known, rather than statically creating various versions of an original document at the time of developing the document.

The conformal aspect of the method refers to the placement and selection of the display elements and characteristics in a manner most suitable to the geometry parameters and capabilities of at least one display view of a particular display device.

The localized aspect of the method is the selection of a natural language and at least one character which most closely matches the language recommended by a user profile containing the user's preferences.

The present invention can also be applied to small display views on display devices, such as those for personal computers and workstations. It may also be used on specialized devices such as those used in telephones, sound and video systems, security systems, ovens, refrigerators, and PDAs (personal digital assistants).

The present invention provides a number of advantages. The development time for an individual application is dramatically reduced because the large number of different versions of the application do not have to be created. Maintenance of the application is also minimized because the application does not have to be maintained in a large array of separate files each being maintained separately. The present invention works extremely well with mobile communication display devices since they commonly have small displays and limited input and output capabilities.

BRIEF DESCRIPTION OF THE DRAWINGS

FIG. 4 illustrates s flow diagram for a dynamic, conformal, and localized display mapping method according to another embodiment of the present invention.

FIG. 5 illustrates a flow diagram containing a localization process, a prioritization process, a display selection process, and an organization process for creating a display document to fit on a display device.

FIG. 6 illustrates a flow diagram for the localization process of FIG. 5.

DESCRIPTION OF THE PREFERRED EMBODIMENT

For exemplary purposes, the present invention is illustrated in the context of providing a document containing web pages through an internet communication infrastructure. It should be understood, however, that the present invention can be applied to many different communications networks, not limited to the internet alone, and to various applications instead of web pages.

Figure 1:
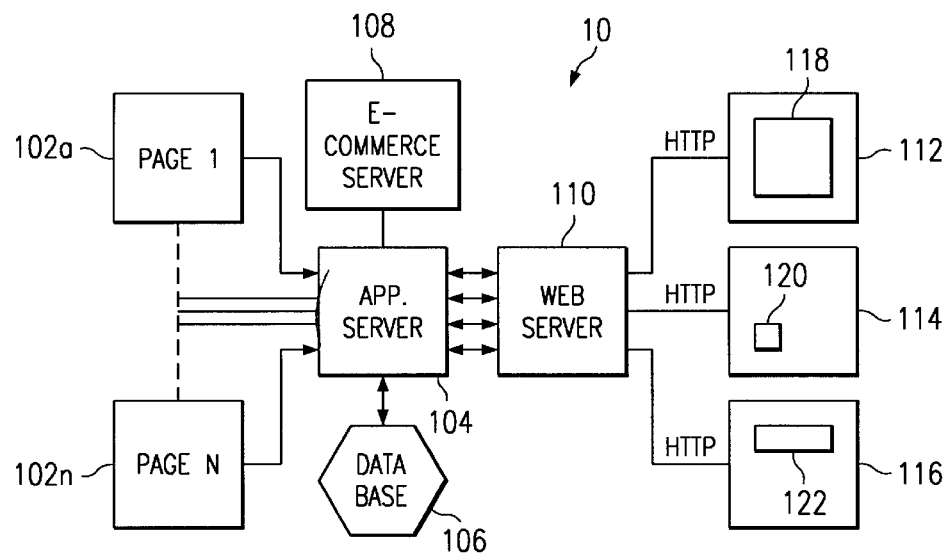
FIG. 1 illustrates a conventional internet based data communications network having an application server deliver one or more documents and/or applications to a set of display devices.
Figure 2:
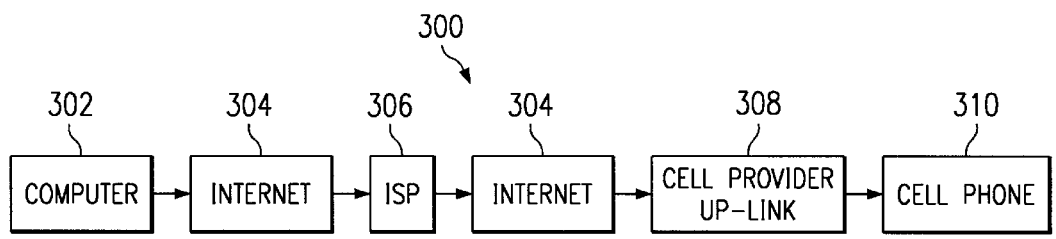
FIG. 2 illustrates an overview of a dynamic, conformal, and localized display communications system according to one embodiment of the present invention.

Referring to FIG. 2, a dynamic, conformal, and localized display communication system 300 is shown. The communication system 300 includes a plurality of computer systems and information servers centered around one or more networks. A first computer system 302 is initially used to create an application description file (FIG. 3), e.g., in a particular markup language. The application description file can be transmitted over the internet 304 to a special mapping system 306 which, in some embodiments, may be located at an internet service provider (ISP). The application description file is formatted to describe contents to be displayed on any display device, but not in any single format.

The mapping system 306 may actually contain information for how to conduct conformal, localized display mapping for a particular display device. The mapping system 306 may have a user database which stores a series of user profiles, each user profile defining viewing preferences indicated by a user. The application description file is then mapped by the mapping system 306 into a display document or application (collectively "document"). The document is then transmitted via the internet 304 over a communication link 308 (such as a cellular service provider's up-link channel) to a particular receiving (target) display device 310. In the example shown, the display device 310 is a cell phone, and a Wireless Markup Language (WML) is used by the mapping system 306 for generating the display document.

For other display devices, the mapping system 306 may have to create a file in a different manner (e.g., in Hypertext Markup Language (HTML)) as necessary.

Figure 3:
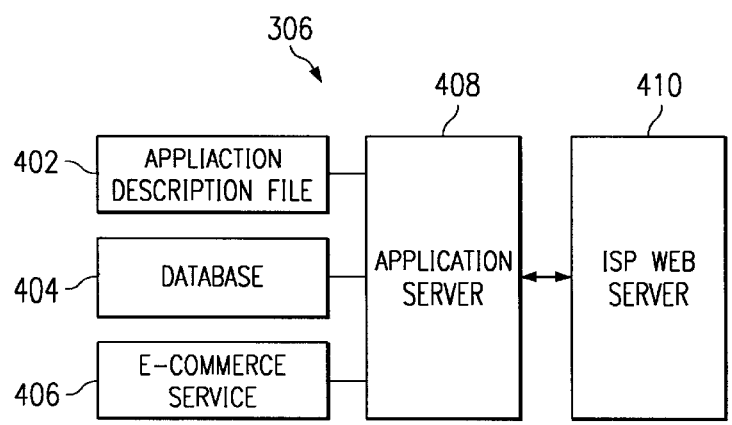
FIG. 3 shows a detailed view of a mapping system used in the communications system of FIG. 2.

Referring now to FIG. 3, a detailed view of the mapping system 306 is shown. The mapping system 306 includes an application server 400 that receives information from an application description file 402, a database 404, and/or an e-commerce server 406. The application server 400 uses the information to create a single web page that is formatted to display on a target display device such as the cell phone 310 in FIG. 2. A web server 408 is used to assist the dynamic creation of the web page and to transmit the web page on to the target display device.

FIG. 4 illustrates an overview of a conformal localized mapping method 409 according to one embodiment of the present invention. Three classes of information are taken by the mapping system 306 from the application description file 402 for generating an appropriately presentable web page on a specific display device. It is also understood that all three classes of information do not need to be included in one single application description file. In addition, some of the information can be maintained and retrieved from a separate database accessible by the application description file.

The application description file 402 includes at least one generalized form 410 which contains a series of prompts and other data information. A prompt usually contains a set of text strings, and/or images and a set of fields. The prompt is essentially a user interface whereby a user can read the text strings, view the images, and possibly enter data into the fields.

In some cases, the application description file may include fields with predefined default text strings. Both the fields and the text strings may have preferred foreground and background color preferences. The images in the application description file 402 normally include information about the colors used for the image, horizontal and vertical dimensions of the image, and an actual bitmap of the image. Each prompt is thereby considered to be the primary location to store text and image information, and to receive user input information.

A second class of information includes display limitation information 412 acquired either from a predetermined display device or from a database which contains information about the display device. From this information, the mapping system 306 can extract sufficient information about display limitations. These limitations may indicate what objects can be displayed, what colors can be displayed, what images or fonts are allowed. They may also include the physical geometry parameters of the target device's display view. For instance, information may be included about the geometry of the display view in pixels and in millimeters, specific character sets that are needed, graphic support of the display device, color model of the display device, and fonts available.

There are usually at least two ways to inform the mapping system 306 about the display limitations of the target display device. First, the limitations of the display device can be reported and stored in a database. The database can have, for example, a tabular form or a lookup table which contains display limitations for a list of display device types. The mapping system 306 can thereby look for the display limitations for a particular display device type and retrieve the information for future use. As an alternative, the mapping system 306 can obtain the display limitations directly from the target display device during an early stage of communication.

A third class of information includes a user profile 414 which shows viewing preference information concerning any document to be display on the target display device. The user profile 414 may provide information about a locale in which the person lives, a minimum size of characters that the user is capable of reading, or a natural language the user can or cannot read. Similar to the display limitations described above, the viewing preference information can be obtained from a database or directly from the display device.

Based on the information contained in the application description file, the mapping system 306 generates a display document 416 which contains a series of mapped elements, information about their physical characters in particular colors and fonts, and their absolute positions in a display document for a specific display device. The display document is generated by the mapping system 306 in a computer language that is supported by the display device and then used by the display device to present information to the user.

FIG. 5 is a flow diagram showing key steps taken by the mapping system 306 for processing information in the application description file 402 to create a display document for the target display device. The key steps briefly describe processes discussed in greater detail with respect to FIGS. 6–9 below. Upon completion of the processes, the mapping system 306 can configure the document to appropriately appear on the selected display device.

At step 502, a localization process is conducted. In this process, various contents (e.g., text strings, fields, and images) that are written or described in foreign (and user-unacceptable) languages are set aside.

At step 504, a prioritization process is conducted in which available contents are evaluated so that those that conform to the display limitations of the display device can be assured to appear in the display device.

At step 506, contents for a final form of the display document are selected. This selection may utilize one or more prompts to the target display device. It is preferred that each prompt has one text string, one field, and one image. A specific set of prompts are also selected.

Finally at step 508, an organization process is executed to arrange the location of the selected contents in the display document with display parameters such as horizontal and vertical (or simply absolute X and Y) coordinates.

Referring now to FIG. 6, the localization process of FIG. 5 is shown in greater detail. The localization process may include three additional processes: a user profile localization process 602, a display localization process 604, and an image localization process 606.

In the user profile localization process 602, the application description file is analyzed according to the language reading capability of the user. This allows certain text strings and fields to be ignored.

In the display localization process 604, the geometric parameters and other characteristics of the display device are compared against the application description file. Special fonts, display characteristics, and text strings which are not supported by the display device will be ignored.

In the image localization process 606, the graphic capability of the display device is checked to ensure that images in the application description file can be readily presented. Unsupported images are subsequently ignored.

It is understood that the above mentioned processes can be performed in any order, and the result of these processes is not dependent on the order of execution. If a failure occurs during any of the above process, the mapping system 306 may issue an appropriate error message or find an alternative way to display predetermined default contents.

Figure 7:
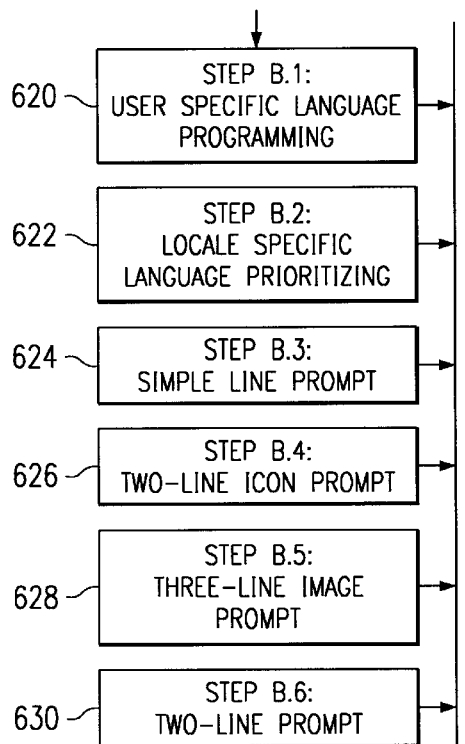
FIG. 7 illustrates a flow diagram for the prioritization process of FIG. 5.

Referring to FIG. 7, the prioritization process 504 is shown in further detail. Since text strings are inherently descriptive and likely to describe the images or introduce the fields for the users to enter data, they can be considered to be more important than other contents in many cases. One objective of this process is to find one or more text portions of the application description file that are of the most value to the user. These portions can then be provided to the display device. Consequently, the text strings of the application description file are evaluated against various factors to determine which text strings have the priority to be placed onto the display device.

The prioritization process can be separated into six (6) sub steps, which can be executed in any order or in parallel. These six steps are user-specific language prioritization 620, locale specific language prioritization 622, single line prompting 624, two-line icon prompting 626, three-line image prompting 628, and two-line prompting 630.

Two parameters—LANGUAGE and FIT—are used as benchmarks for ranking various prompts. Initially, each element of the prompt (a text string, a variable field, or an image) is assigned with a zero value (0). The value of the element is increased according to the rules shown below.

Some embodiments of the present invention also uses "goodness factors" to parameterize the prioritization of the contents of the application description file. There are at least four predetermined goodness factors: a Text Goodness Factor (TGF), an Image Goodness Factor (IGF), a Font Goodness Factor (FGF), and a Language Goodness Factor (LGF), each having a predefined base value. These values reflect emphasis or preferences of the user for items in each element, e.g., text, image, font, and language. For example, an image having a value of 99 is more important to the user than an image having a value of 90.

Moreover, some weighting factors are also defined to allow the programmer/designer to adjust the comparative importance of each element with respect to other elements. In some embodiments, a Text Goodness Weight (TGW), an Image Goodness Weight (IGW), a Font Goodness Weight (FGW), Language Fit Goodness Weight (LFGW), and a Language Goodness Weight (LGW) are included. With these weighting factors, the programmer for the web page can efficiently emphasize one element over the other, depending on the display limitations of a particular display device and the viewing preferences of the user by modifying the values of these weighting factors. The processes above thereby facilitate an efficient generation of the display document, readily displayable on the display device when needed.

With continued reference to FIG. 7, in the user specific language prioritization 620, the text string portion, regardless of which natural language it is written, is compared against information contained in the user profile. The user profile indicates languages that the user is capable of understanding and the user's recommendation of preferred languages. Based on this information, the text portion is ranked by the LANGUAGE parameter from the most preferred language to the least.

In the locale specific language prioritization process 622, the languages used for the text portion are compared to the popular languages used in the locale where the user lives. The value of the LANGUAGE parameter is incremented by "n," where "n" is the population percentage using that language in the locale. For example, if the user lives in Texas, Spanish will be a popular language other than English. Consequently, the value for the LANGUAGE parameter for text strings in Spanish will be incremented in proportion to the percentage of Spanish speaking residents in Texas.

After the text strings are prioritized based on natural languages, a determination is made as to whether or not the information can be appropriately displayed on the display device. The value of the FIT parameter reflects this determination. At step 624, a decision is made as to whether or not the information of each prompt (which may include the text string, the field, and the image) can fit onto a single line of the display view. If so, the value of the FIT parameter is incremented by a predetermined value of the TGF.

At step 626, if the following conditions are met, the FIT parameter is incremented by 3×TGF:

the prompt has an image, the image and all the text strings concerning the image can fit on a first line on the display view, the field of the prompt can fit on a second line next to the first line so that a user can enter input data on the second line.

This is the preferred image.

At step 628, if the following conditions are met, the FIT parameter is incremented by 2×TGF+1:

the prompt has an image, the image alone fits on a first line on the display view, the text strings concerning the image can fit on a second line right next to the first line, the field can fit on a third line next to the second line.

This three-line image prompt is usually used when the display view is too small to contain the text, the image, and the field on the same line and so the information is place on multiple lines.

At step 630, if the following conditions are met, the FIT parameter is incremented by 2×TGF:

there is no image in the prompt, the text string and the field each fits on a single line.

The above described steps can be conducted in any order or in parallel. None of these processes actually removes any of the information from the application description file. Instead, the processes simply assign values of prioritization to the contents of the profile description file so that a decision can be made as to which contents are to be used, and in what forms the information should be displayed.

An important prioritization step is the assignment of the various types of ranking factors. For example, a prompt such as "Enter your name" is given a TGF value of 100 when most of the characters in the string are shown in the lower case and only character "E" is capitalized. However, it's given a TGF value of 70 when all characters are shown in upper case. If the display device is capable of displaying both the upper and lower case, then the prompt of a TGF value of 100 will be selected.

The TGF values are usually assigned by the users, while the weighting factors are usually assigned by the programmers. In the prior example, the user can choose the most verbose form, e.g., "Enter your name:" by assigning a high value to it and leave the terse forms such as "Your name:" or "Name:" with lower values. With these ranking factors attached, the prompts are prioritized and can be selected for display accordingly.

Figure 8:
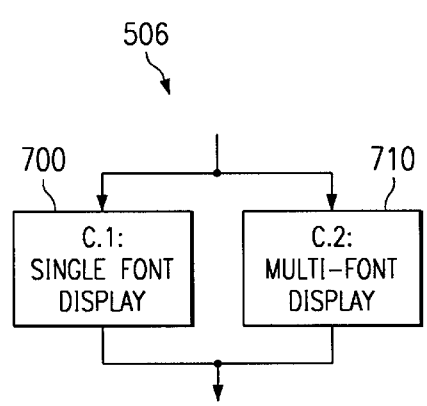
FIG. 8 illustrates a flow diagram for the display selection process of FIG. 5.

Referring now to FIG. 8, the selection process 506 is illustrated in greater detail. In this process, a final form of the display document is determined. The final form is preferred to contain each prompt, one text string, one field, and one image. For example, at step 700, if the display device has only one available font at a time, the form of the application description file is partitioned into a number of forms, each having text in one font. If a prompt in a specific form does not contain text strings in the available font, the entire prompt is dropped. The form having the highest value of:

LANGUAGE×LFGW+FIT×FGW becomes part of the final form to be displayed. Most of the commonly available display devices currently used for mobile computing only have a single font that can be displayed at a time. Larger computing devices and personal digital systems can frequently display multiple fonts.

At step 710, if the display device can handle multiple fonts, the final form selected should be composed of prompts having the highest value for

LANGUAGE×LFGW+FIT×FGW.

If multiple forms have the same value, then the TGF and LGF variables can be used to resolve the conflicts. For most display devices, steps 700 and 710 are mutually exclusive. Moreover, through the above processes for selecting the final form of the document, the resulting form also has chosen a single language to be used for the display. If a process failure has occurred during either step 700 or step 710, no final form may be produced.

Figure 9:
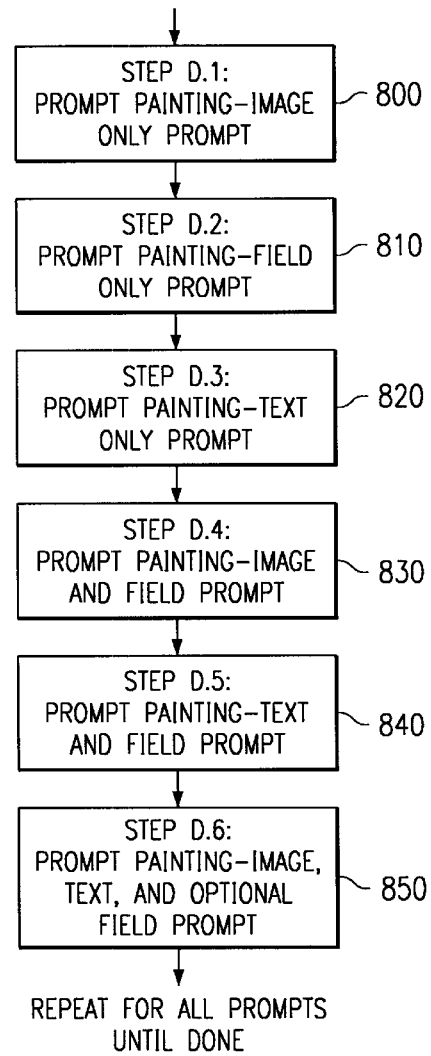
FIG. 9 illustrates s flow diagram for the organization process of FIG. 5.

FIG. 9 illustrates the organization process for determining actual display locations in a display view for the information selected through the above described processes. This process is referred to as "prompt painting" because one or more display formats are generated based on different arrangement of the prompts. Each display format will be ranked based on a numerical value calculated from a formula containing the ranking factors and weighting factors mentioned above. The format with the highest score will be the final display format.

There are generally at least three separate prompt painting prompt processes: an image only prompt process 800, a field only prompt process 810, and a text only prompt process 820. In addition to these prompt painting prompt processes, there are also prompt painting for image and field prompt process 830, a text and field prompt process 840, and an image, text and optional field prompt process 850.

In the process for an image only prompt 800, the image is simply centered in the display view. In the process for painting a field only prompt 810, if a field follows another field and fits on the same line with a space between them, then the prompt is placed on the same line with the preceding field. Otherwise, it is placed on a line by itself. In the process of painting a text only prompt 820, the text is left justified if the natural language is a left to right natural language, and right justified if the text is in a right to left language. If the text is wider than the display view, it is mapped to multiple lines. In conducting the prompt painting processes, it is assumed that the words of the prompts will not be broken across lines unless some hyphenations are present. If a single word is still wider than the length of a single line on the display view, and it is not hyphenated, it can be broken at a character.

In the image and field prompt process 830, the image is located on the left side of the display view. The field follows the image if it fits in the space left on the same line. Otherwise, the image is left justified and the field is placed on the next line.

In process the text and field prompt process 840, the text is left justified for left to right languages and the field follows to its right. For right to left languages, the text is right justified and the field follows to its left. If the text and the field do not fit on the same line, they are placed on separate lines, with the text of the prompt always situated above the field.

In the text and optional field prompt process 850, the prompt is treated as a text and field prompt. The images may be placed to the left of the text for left to right languages and to the right of the text for right to left languages. If all of the elements do not fit on the same line, the image may be placed ahead of the text.

The mapping system 306 executes the processes as described above to create a display document. The display document recognizes the location of the display view on the display device, and describes display parameters such as horizontal and vertical locations of each element, foreground and background colors used, text string content, fonts, special character sets, size of the field, default text string for the field, location of the images, etc. Since the mapping system 306 intelligently maps the content from the application description file to the display document in order to fit for a specific display view, it eliminates the need for horizontal scrolling. Only vertical scrolling may be needed. Moreover, buttons and check boxes in a web page are treated as either images or specialized prompts.

The present invention is thereby able to dynamically generate a display document for a display device based on the preferences of the users and the display limitations of the display device.

One advantage of the present invention is that no separate, static document in a particular format needs to be created for each different display device in order to present information in a source document. The display documents are created dynamically instead. Hence, unlike the conventional method, designers/programmers of a document do not have to create a series of documents containing similar information but in different formats or computer languages.

Another advantage is that system maintenance is greatly reduced due to the fact that the proliferation of similar documents are significantly restrained. Consequently, providers are only required to carry out extremely light but focused maintenance work.

Another advantage is that it is almost ensured that a display document conforms to all display limitations of a selected display device or a predetermined display view.

Another advantage is that the displayed contents on a particular display device used by a user will be useful and valuable to the user, since the user's personal viewing preferences are taken into consideration while forming the display document.

The above disclosure provides many different embodiments, or examples, for implementing different features of the invention. Specific examples of components, and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for dynamically creating a display document to fit on at least one display device in a computer network based on one or more display limitations of the display device and one or more viewing preferences of a user of the display device, the method comprising the steps of:

providing one or more source contents in a predetermined format;

recognizing the display limitations of the display device from a first information source;

determining the viewing preferences of the user from a second information source;

selecting one or more preferred display contents from the source contents by a mapping system in conformance with the display limitations and the viewing preferences; and generating the display document containing the preferred display contents to be displayed on the display device.

2. The method of claim 1 wherein the source contents are contained in an application description file.

3. The method of claim 1 wherein the first information source is a database containing display limitations for one or more other display devices.

4. The method of claim 1 wherein the display limitations include:

one or more geometry parameters of a display area on the display device;

one or more text fonts available on the display device; and one or more image parameters supported by the display device.

5. The method of claim 1 wherein the viewing preferences are obtained from the user and stored in the second information source.

6. The method of claim 1 wherein the viewing preferences include:

information about a locale in which the user lives;

a minimum size of a text font readable by the user; and one or more natural languages understood by the user.

7. The method of claim 1 wherein the step of selecting includes the steps of:

selecting one or more portions of the source contents that are written in at least one natural language understood by the user and displayable on the display device; and prioritizing the selected portions by a predetermined set of measuring parameters.

8. The method of claim 7 wherein the measuring parameters include one or more ranking parameters and weighting factors.

9. The method of claim 7 wherein the step of selecting further includes the steps of:

ignoring at least one text portion of the source contents that is not in the natural language understood by the user;

ignoring at least one text portion of the source contents restricted by the display limitations of the display device; and ignoring at least one image of the source contents restricted by the display limitations of the display device.

10. The method of claim 7 wherein the step of prioritizing further includes the step of ranking the text portions according to the language preference as indicated in the viewing preferences.

11. The method of claim 1 wherein the step of generating further includes the step of organizing the preferred display contents with horizontal and vertical coordinates identifying their locations on the display device.

12. The method of claim 11 wherein the step of organizing further includes the steps of:

organizing the preferred display contents in one or more display formats;

ranking the display formats using one or more ranking factors and weighting factors; and selecting the highest ranked display format for the display document.

13. A method for dynamically creating a display document by a mapping system to fit on a comparatively small display area of a display device integrated in a communication device operated by a user, the communication device being able to access information from a communications network, the display device having one or more display limitations, the user having one or more viewing preferences for information in the display document shown on the display device, the method comprising the steps of:

programming one or more source contents with a predetermined format;

selecting the source contents in one or more natural languages understood by the user as instructed by the user's viewing preferences;

prioritizing the selected source contents according to the display limitations and the viewing preferences; and finalizing on the selection of one or more preferred display contents from the prioritized source contents, wherein the display document is generated based on the finalized display contents.

14. The method of claim 13 wherein the source contents, the display limitations, and viewing preferences are stored in an application description file.

15. The method of claim 13 wherein the source contents are stored in a first database, the display limitations are stored in a second database, and viewing preferences are stored in a third database, all of which are accessible and retrievable by the mapping system.

16. The method of claim 15 wherein the second database contains display limitations for one or more other display devices, and the third database contains viewing preferences for one or more other users.

17. The method of claim 13 wherein the source contents are stored in a database, and the display limitations and viewing preferences are provided by the communication device dynamically to the mapping system during a communication session there between.

18. The method of claim 13 wherein the source contents further include one or more text elements, image elements, and field elements.

19. The method of claim 13 wherein the display limitations include:

one or more geometry parameters of a display area on the display device;

one or more text fonts available on the display device; and one or more image parameters supported by the display device.

20. The method of claim 13 wherein the viewing preferences include:

information about a locale in which the user lives;

a minimum font size readable by the user; and one or more languages understood by the user.

21. The method of claim 13 wherein the step of prioritizing includes the step of prioritizing the source contents using one or more ranking parameters and weighting factors.

22. The method of claim 21 further includes the steps of:

selecting one or more source contents that is written in a natural language understood by the user; and selecting one or more source contents that conform to the display limitations of the display device, wherein the selected source contents are the preferred display contents as indicated by the ranking factors and the weighting factors.

23. The method of claim 13 wherein the step of finalizing further includes the step of organizing the preferred contents with horizontal and vertical coordinates identifying their locations on the display device.

24. The method of claim 23 further comprising the steps of:
- organizing the preferred contents in one or more display formats;
- ranking the display formats using one or more ranking factors and weighting factors; and
- selecting the highest ranked display format for the display document.

25. The method of claim 13 wherein the communication device is a mobile device.

26. A computer program for dynamically creating a display document to fit on a comparatively small display area of a communication device operated by a user, the communication device being able to access information from a communications network, the communication device having one or more display limitations, the user having one or more viewing preferences for information in the display document shown on the communication device, the program comprising:
- one or more source contents with a predetermined format;
- instructions for selecting the source contents in one or more natural languages understood by the user as instructed by the user's viewing preferences;
- instructions for prioritizing the selected source contents according to the display limitations and the viewing preferences; and
- instructions for finalizing on the selection of one or more preferred display contents from the prioritized source contents, wherein the display document is generated based on the finalized display contents.

27. The program of claim 26 wherein the source contents are stored in a first database, the display limitations are stored in a second database, and the viewing preferences are stored in a third database, all of which are accessible and retrievable by the program.

28. The program of claim 26 wherein the source contents are stored in a database, the display limitations and viewing preferences are provided by the communication device dynamically to the program during a communication session there between.

29. The program of claim 26 wherein the source contents further includes one or more text elements, image elements, and field elements.

30. The program of claim 26 wherein the display limitations include:
- one or more geometry parameters of the display area on the communication device;
- one or more text fonts available on the communication device; and
- one or more image parameters supported by the communication device.

31. The program of claim 26 wherein the viewing preferences include:
- information about a locale in which the user lives;
- a minimum font size readable by the user; and
- one or more languages understood by the user.

* * * * *